(12) United States Patent
Mossoba et al.

(10) Patent No.: US 10,748,133 B1
(45) Date of Patent: Aug. 18, 2020

(54) TRANSACTION MANAGEMENT BASED ON AUDIO OF A TRANSACTION

(71) Applicant: Capital One Service, LLC, McLean, VA (US)

(72) Inventors: Michael Mossoba, Arlington, VA (US); Joshua Edwards, Philadelphia, PA (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/777,484

(22) Filed: Jan. 30, 2020

(51) Int. Cl.
*G06Q 20/32* (2012.01)
*G06Q 20/42* (2012.01)
*G10L 25/90* (2013.01)
*G06Q 20/20* (2012.01)
*G06N 20/00* (2019.01)
*G10L 25/51* (2013.01)

(52) U.S. Cl.
CPC ......... *G06Q 20/3272* (2013.01); *G06N 20/00* (2019.01); *G06Q 20/204* (2013.01); *G06Q 20/209* (2013.01); *G06Q 20/3224* (2013.01); *G06Q 20/42* (2013.01); *G10L 25/51* (2013.01); *G10L 25/90* (2013.01); *G06Q 20/3223* (2013.01)

(58) Field of Classification Search
CPC ....................... G06Q 20/3223; G06Q 20/3272
See application file for complete search history.

(56) References Cited

U.S. PATENT DOCUMENTS

| | | | |
|---|---|---|---|
| 4,021,644 A | 5/1977 | Dreslinski | |
| 6,102,290 A | 8/2000 | Swartz et al. | |
| 6,332,575 B1 | 12/2001 | Schuessler et al. | |
| RE41,717 E | 9/2010 | Dejaeger | |
| 10,192,087 B2 | 1/2019 | Davis et al. | |
| 2013/0203345 A1* | 8/2013 | Fisher ................... | H04W 52/02 455/41.1 |
| 2016/0086209 A1* | 3/2016 | Frank ................. | G06Q 30/0225 705/14.13 |
| 2017/0011373 A1* | 1/2017 | Todasco ................. | G06Q 20/10 |

* cited by examiner

*Primary Examiner* — A. Hunter Wilder
(74) *Attorney, Agent, or Firm* — Harrity & Harrity, LLP

(57) ABSTRACT

An example transaction analysis platform is described herein. The transaction analysis platform may analyze an audio signal to determine whether a user is associated with a transaction. The transaction analysis platform may determine that a tone of the audio signal is a transaction tone associated with the transaction. The transaction analysis platform may process, based on detecting the transaction tone, the audio signal to identify a set of tones associated with the transaction. The transaction analysis platform may generate, based on a quantity of the set of tones, transaction information associated with the transaction, wherein the transaction information identifies a quantity of items associated with the transaction, wherein the quantity of items corresponds to the quantity of the set of tones. The transaction analysis platform may perform an action associated with the transaction information and a transaction account of the user.

21 Claims, 9 Drawing Sheets

TRANSACTION MANAGEMENT BASED ON AUDIO OF A TRANSACTION

BACKGROUND

A transaction card (e.g., a credit card, a debit card, a gift card, an automated teller machine (ATM) card, a rewards card or client loyalty card, and/or the like) and/or a transaction account device (e.g., a smart transaction card, a smartphone, and/or the like) may be used in a transaction to pay for products or services via transaction devices of merchants. The transaction devices may facilitate communication of information associated with transactions. For example, a transaction device may receive transaction account information from a transaction card, provide the transaction account information to a transaction backend for approval of the transaction, and receive an authorization to permit the transaction card to be used in the transaction.

SUMMARY

According to some implementations, a method may include determining that a user is within a threshold distance of a location of an entity, wherein the entity is capable of engaging in a transaction with the user; causing, based on the user being within the threshold distance of the location, a microphone to be activated to generate an audio signal associated with a transaction involving the user and the entity; analyzing the audio signal to detect a transaction tone associated with the transaction; determining an audio characteristic of the transaction tone; processing, based on the audio characteristic of the transaction tone, the audio signal to identify a set of tones associated with the transaction, wherein the set of tones are associated with the audio characteristic; determining a quantity of the set of tones; generating, based on the quantity of the set of tones, transaction information associated with the transaction, wherein the transaction information identifies a quantity of items associated with the transaction, wherein the quantity of items corresponds to the quantity of the set of tones; and performing an action associated with the transaction information and a transaction account of the user.

According to some implementations, a device may include one or more memories; and one or more processors, communicatively coupled to the one or more memories, configured to: receive an audio signal to determine whether a user is associated with a transaction; detect, within the audio signal, a transaction tone associated with the transaction; process, based on an audio characteristic of the transaction tone, the audio signal to identify a set of tones associated with the transaction, wherein the set of tones are associated with the audio characteristic; determine, based on a quantity of the set of tones, a quantity of items associated with the transaction; generate, based on the quantity of the set of tones, transaction information associated with the transaction, wherein the transaction information identifies the determined quantity of items; and perform an action associated with the transaction information and a transaction account of the user.

According to some implementations, a non-transitory computer-readable medium may store one or more instructions. The one or more instructions, when executed by one or more processors of a device, may cause the one or more processors to: analyze an audio signal to determine whether a user is associated with a transaction, wherein the audio signal is received from a user device of the user; determine that a tone of the audio signal is a transaction tone associated with the transaction; process, based on detecting the transaction tone, the audio signal to identify a set of tones associated with the transaction, wherein the set of tones correspond to the transaction tone; generate, based on a quantity of the set of tones, transaction information associated with the transaction, wherein the transaction information identifies a quantity of items associated with the transaction, wherein the quantity of items corresponds to the quantity of the set of tones; and perform an action associated with the transaction information and a transaction account of the user.

DETAILED DESCRIPTION

Figure 1A:
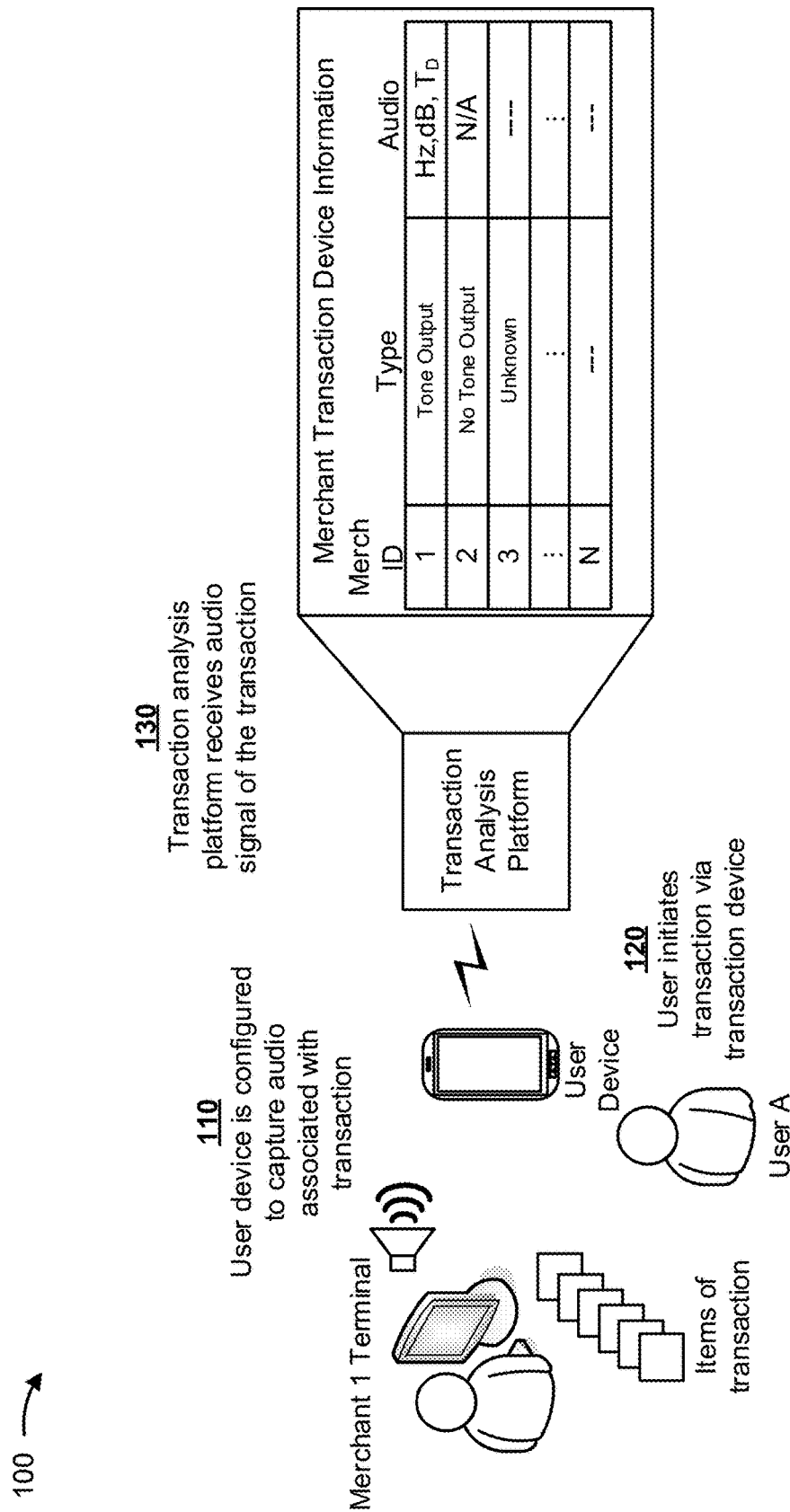
FIGS. 1A-1D are diagrams of an example implementation described herein.

The following detailed description of example implementations refers to the accompanying drawings. The same reference numbers in different drawings may identify the same or similar elements.

Users (e.g., individuals, such as consumers) frequently engage in transactions with entities (e.g., merchants). For example, a user may visit a merchant location (e.g., a retail store, a branch, a franchise, and/or the like), engage in a transaction to purchase one or more items (e.g., goods or services) using a transaction account of the user and/or transaction device (e.g., a point-of-sale (POS) terminal), and receive a receipt of the transaction. In some instances, the user may keep the receipt to manage finances, transactions, budgets, business performance, and/or the like. The receipt may include a physical paper receipt and/or an electronic receipt, such as a receipt received via email, text message, and/or the like.

Due to a potentially vast number of transactions that may be performed by the user during a particular time period, the user's ability to track, maintain, and/or identify particular characteristics of the transactions using the receipts can be relatively complex. For example, if the user wants to identify a purchase of an item that cost more than a threshold amount (e.g., more than $100), the user may need to manually review the receipts, and/or the receipts may need to be analyzed by a computing device (e.g., using a data processing technique, an image processing technique (e.g., optical character recognition), and/or the like), which can consume relatively high amounts of computing resources (e.g., processing resources, memory resources, and/or the like required to analyze the receipts) and/or network resources (e.g., communication resources to retrieve emailed receipts stored on an email server) to identify itemized receipts with purchased items that cost more than the threshold amount.

Furthermore, typically, an issuing financial institution associated with the transaction account may maintain records (e.g., in a transaction log) of the transactions that identify a date (and/or time) of the transaction, an entity involved in the transaction (e.g., the merchant), and/or the like. However, due to privacy restrictions and/or in an effort to avoid any complexity involved in storing individual receipts, the issuing financial institutions may not store or maintain itemized receipts that include individual items that were purchased in the transactions.

Some implementations described herein provide a transaction analysis platform that facilitates transaction management based on audio characteristics of a transaction. For example, the transaction analysis platform may analyze an audio signal associated with the transaction, wherein the audio signal is received from a user device of the user, determine that a tone of the audio signal is a transaction tone that indicates that a transaction process has been initiated, process the audio signal to identify a set of tones corresponding to a quantity of items associated with the transaction (e.g., being registered to the transaction), generate transaction information based on the set of tones, and perform an action associated with the transaction information and a transaction account of the user. In this way, the transaction analysis platform may provide information associated with a transaction that may indicate a quantity of items involved in the transaction. For example, the transaction analysis platform may annotate and/or permit a transaction account platform to annotate a transaction log (e.g., an entry of the transaction log) with the transaction information, and more specifically, with a quantity of items of the transaction. The quantity of items may be used to identify an average price of items involved in a transaction, identify transactions that included high-valued items, and/or the like.

In this way, a transaction analysis platform, as described herein, may quickly and efficiently, relative to previous techniques, determine a quantity of items involved in a transaction based on audio associated with the transaction, thereby conserving computing resources (e.g., processor resources, memory resources, used to determine a quantity of items involved in a transaction and/or the like) and/or network resources (e.g., by reducing a number of communications and/or inquiries associated with obtaining a receipt associated with a transaction). Furthermore, some implementations described herein use a rigorous, scalable, computerized process (e.g., in association with and/or for thousands, millions, or more users, transaction accounts, and/or the like) to perform tasks or roles (e.g., simultaneously on the thousands, millions, or more users, transaction accounts, and/or the like) that were not previously performed. For example, previously, a technique did not exist to analyze an audio signal associated with a transaction, identify a set of tones corresponding to items being registered to the transaction, and perform an action based on identifying the set of tones (e.g., annotating a transaction log with the quantity of items, training a transaction analysis model used to detect the set of tones, and/or the like). Furthermore, a process for determining, generating, and/or managing transaction information, as described herein, conserves computing resources and/or network resources that would otherwise be wasted in attempting to review, store, and/or maintain itemized receipts of transactions of a user.

As used herein, a "merchant" may refer to any individual or organization involved in the sale or leasing of goods or services. For example, a merchant may be a trader, a retailer, a vendor, a seller, a lessor, and/or the like.

FIGS. 1A-1D are diagrams of an example implementation 100 described herein. Example implementation 100 includes a user device (shown as a smartphone) of a user ("User A"), a transaction device ("Merchant 1 Terminal") of a merchant (referred to herein as "Merchant 1"), a transaction analysis platform, and a transaction account platform. The transaction analysis platform may be communicatively coupled with the user device via a network. Additionally, or alternatively, the transaction analysis platform of example implementation 100 may be included within the user device (e.g., as a module, an application, and/or the like). As described herein, the transaction analysis platform may determine a quantity of items associated with a transaction of a transaction account of the user based on information received from the user device.

In association with implementations described herein, the transaction analysis platform may receive, from the user (e.g., via the user device), access information (e.g., that permits the transaction analysis platform to operate in accordance with examples described herein). For example, the user device may be associated with a user, and the access information may include a set of credentials associated with a transaction account (e.g., a financial account, such as a bank account, a credit account, a debit account, and/or the like) of the user, a username/password combination of the user, a security token (e.g., that provides limited access to a transaction account) associated with the user, a biometric associated with the user, and/or the like.

As described herein, a transaction account may be associated with a user to permit the user to engage in transactions via the transaction account (e.g., using funds associated with the transaction account). The transaction account may be managed and/or maintained by the transaction account platform for the user (e.g., using a transaction log to permit the user to view and/or access transaction activity of the transaction account). In some implementations, the transaction account platform may manage hundreds, thousands, or more transaction accounts, each of which may be used in hundreds, thousands, or more transactions, and/or the like.

In some implementations, the transaction analysis platform may receive the access information based on requesting the access information from the user device (e.g., by providing a prompt via a display associated with the user device), based on a user of the user device inputting the access information (e.g., via a user interface, via an application installed on the user device, and/or the like), and/or the like. In some implementations, the access information may permit the transaction analysis platform to access a component (e.g., a microphone, a camera, a location device (e.g., such as a geolocation device, a geographical position system (GPS), and/or the like) of the user device for a particular amount of time to permit the transaction analysis platform to obtain information associated with the transaction. In some implementations, the transaction analysis platform may prompt the user of the user device to permit the transaction analysis platform to access the component of the user device. The transaction analysis platform may utilize a two-factor authentication process to receive authorization information from the user. The two-factor authentication process may increase a security of providing the transaction analysis platform with access to the component of the user device by providing the transaction analysis platform with limited access to the component, by providing the user of the user device with control over whether the transaction analysis platform can access the component, and/or the like.

In some implementations, after receiving the access information, the transaction analysis platform may access the component of the user device using the access information. For example, the transaction analysis platform may access a location system of the user device to determine a location of the user device, a microphone to capture audio associated with a transaction, a camera to authenticate the user (e.g., using a biometric analysis, such as facial recognition), and/or the like.

To maintain privacy of a user associated with a transaction account, the transaction analysis platform may ensure that the user opts in (e.g., via access information) to enabling monitoring of transactions and/or access to the transaction account. Accordingly, the transaction analysis platform may be configured to abide by any and all applicable laws with respect to maintaining the privacy of the user and/or content of audio associated with a transaction. In some implementations, the transaction analysis platform may not download (or permanently store) any audio and/or transaction information from the user device, the transaction analysis platform may anonymize and/or encrypt any private information associated with the user and/or the transaction account, and/or the like. In some implementations, the transaction analysis platform may have or may be configured to have limited access to audio associated with transactions involving the user. For example, the transaction analysis platform may be configured to only have access to audio associated with transactions (e.g., as approved by the user) and/or to audio with certain characteristics (e.g., tones within threshold frequency range, tones within a threshold amplitude range, tones having a particular duration, tones having a particular wavelength, and/or the like). In some implementations, one or more parameters may be configured based on the user and/or based on a preference of the user. For example, User A may indicate that the user device is typically carried in pocket or purse, which would distort audio. In such cases, the transaction analysis platform may account for such preferences by adjusting ranges of one or more of the audio characteristics to detect transaction tones, as described herein. Additionally, or alternatively, the transaction analysis platform may only be capable of analyzing a transaction for a threshold time period after the transaction (e.g., ten minutes, an hour, a day, and/or the like), to only have access to a limited number of most recently detected transactions (e.g., the last ten detected transactions, twenty detected transactions, and/or the like), and/or the like.

Accordingly, as described herein, User A may provide access information associated with controlling a component of the user device and/or enable monitoring and/or analyzing of audio associated with User A's transactions. For example, upon installing an application on the user device (e.g., an application for managing transaction information associated with transactions of the user), the application may request (e.g., via an authentication token) that User A authorize monitoring of User A's transactions. Such a request may indicate to User A that the monitoring is for obtaining audio associated with transactions (e.g., transactions involving Merchant 1 and/or other merchants), generating transaction information associated with the transactions, and/or performing one or more actions associated with the transaction information. With an approval authorizing the monitoring of User A's transactions (e.g., received via a user input from User A), the application may capture audio (e.g., by activating a microphone) associated with a transaction when the application determines that a transaction may occur and/or that a transaction is occurring (e.g., based on being within a threshold distance of Merchant 1, based on receiving a communication signal (e.g., a near field communiation (NFC) signal, a BLUETOOTH' signal, and/or the like) associated with Merchant 1 (e.g., from Merchant 1 terminal, from a communication device at the location of Merchant 1, and/or the like), based on detecting an initial transaction tone in the audio, and/or the like). In some implementations, when a transaction is to be monitored (or when a microphone is to be activated), the application may prompt the user to authorize the transaction of the user to be monitored, as described herein. The request and/or prompt may enable User A to opt out from being monitored by the application.

As shown in FIG. 1A, and by reference number 110, the user device is configured to capture audio associated with a transaction. For example, the transaction analysis platform may cause the user device to activate a microphone to permit the user device to capture the audio associated with the transaction. In some implementations, the transaction analysis platform may activate an always-on listening mode of the user device and/or be configured to monitor an audio signal of an always-on listening mode of the user device. Additionally, or alternatively, the transaction analysis platform may cause the user device to activate the microphone based on a user input (e.g., a user input instructing and/or authorizing the transaction analysis platform to capture audio to analyze the transaction).

In some implementations, the transaction analysis platform may configure the user device to capture the audio based on a determined location of the user device. For example, the transaction analysis platform may determine that a user is within a location of a merchant, and/or within a threshold distance (e.g., 10 meters, 50 meters, and/or the like) of a location of a merchant, and activate the microphone of the user device to enable the user device to capture audio in an environment of the user device. In such cases, the transaction analysis platform may have access to geographical information (e.g., a geographical mapping platform, navigational platform, and/or the like) to permit the transaction analysis platform to detect that the user device is within a threshold distance of a particular merchant. In this way, rather than consuming resources (e.g., computing resources and/or network resources) processing audio when a user is likely not involved in a transaction and/or is likely not going to be involved in a transaction (e.g., if the user is at home, if the user is not at merchant location, and/or the like), the transaction analysis platform may cause the user device to activate the microphone of the user device when the user is more likely (e.g., based on an estimation using the location information) to engage in a transaction. Accordingly, when User A is within a threshold distance of a location of Merchant 1 (and/or the Merchant 1 terminal), the user device may activate the microphone (e.g., based on instructions from the transaction analysis platform) to permit audio associated with a potential transaction involving User A and Merchant 1 to be captured and/or analyzed, as described herein.

As further shown in FIG. 1A, the transaction analysis platform may utilize a mapping of merchant transaction information to determine whether Merchant 1 is capable of engaging in a transaction with User A that can be monitored by the user device and/or transaction analysis platform. For example, the mapping may indicate merchants known to use transaction devices that audibly produce a tone when registering an item with a transaction, merchants known to use transaction devices that do not audibly produce a tone when registering an item with a transaction, and/or merchants for which the transaction analysis platform has no information regarding whether transaction devices of such merchants audibly produce a tone when registering an item with a transaction. In this way, the transaction analysis platform may determine that if the user is at a merchant location that does not utilize a transaction device that will facilitate monitoring and/or analysis of a transaction, as described herein, the transaction analysis platform may not cause the user device to activate a microphone to capture audio associated with the transaction (thus conserving resources associated with activating the microphone and/or capturing the audio). On the other hand, if the transaction analysis platform determines that the user device is within a threshold distance of a merchant that does use a transaction device that facilitates analyzing a transaction, as described herein, the transaction analysis platform may cause the user device to activate the microphone and/or capture audio associated with a potential transaction. In some implementations, if the transaction analysis platform determines that the user device is within a threshold distance of a merchant that is unknown to the transaction analysis platform (e.g., because the transaction analysis platform has not been used to analyze a transaction involving the merchant), the transaction analysis platform may cause the user device to activate the microphone and/or capture audio to attempt to analyze a potential transaction, as described herein.

In some implementations, the transaction analysis platform may be configured to analyze the audio signal based on a particular type of transaction device identified in the mapping. For example, the transaction analysis platform may be configured to filter the audio signal to remove sounds that would not be associated with a transaction and/or to filter the audio to include only sounds having one or more particular characteristics of tones that may be output from the type of transaction device. In this way, the transaction analysis platform may be configured to monitor the audio signal and/or analyze the audio signal for transaction device-specific tones (e.g., tones that are known and/or configured to be utilized by a particular type of transaction device of a merchant). According to some implementations, the mapping may include more specific information associated with the transaction devices, such as mappings of particular tones to particular items, particular tones for particular types of transactions, particular tones for particular stages of the transaction process, and/or the like.

In this way, the user device may be configured (e.g., by the transaction analysis platform) to capture audio associated with a transaction between the user and the merchant to permit the transaction analysis platform to analyze the audio and/or determine transaction information associated with the transaction, as described herein.

As further shown in FIG. 1A, and by reference number 120, the user initiates a transaction via the transaction device. For example, the user may submit an item that is to be registered to the transaction via the transaction device. More specifically, User A and/or a representative of Merchant 1 may scan an item using a scanning device (e.g., a barcode scanner, a QR code scanner, and RFID detection device, and/or the like) to register the item as part of the transaction.

In this way, the user may initiate a transaction and/or the transaction analysis platform may detect that the user has initiated the transaction to permit the transaction to be analyzed using audio associated with the transaction, as described herein.

As further shown in FIG. 1A, and by reference number 130, the transaction analysis platform may receive an audio signal associated with the transaction. For example, the transaction analysis platform may receive the audio signal from the microphone. In some implementations, the transaction analysis platform may receive the audio signal after the audio signal has been processed by the user device (e.g., processed as described herein to remove noise and/or audio that is not associated with the transaction).

In some implementations, the transaction analysis platform may receive and/or analyze the audio signal (e.g., the audio signal generated by the microphone) in real-time (e.g., as the transaction is occurring and/or as items are being scanned by the user and/or a merchant representative) to detect transaction tones. In such cases, the transaction analysis platform may receive and/or process the audio signal as an audio stream that is analyzed without storing the audio signal. Additionally, or alternatively, the transaction analysis platform may receive the audio signal after the transaction is finalized. For example, the transaction analysis platform may process the audio signal after the user device leaves a location of the merchant, is no longer within a threshold distance of the merchant, and/or is no longer detecting audio (e.g., or specific tones) associated with the transaction and/or the merchant. In such cases, the transaction analysis platform may receive the audio signal (e.g., from a data structure of the user device) as a single set of data (e.g., as an audio file) that can be analyzed to manage the transaction.

In this way, the transaction analysis platform may receive the audio signal to permit the transaction analysis platform to analyze and/or process the audio signal to identify transaction tones associated with the transaction.

Figure 1B:
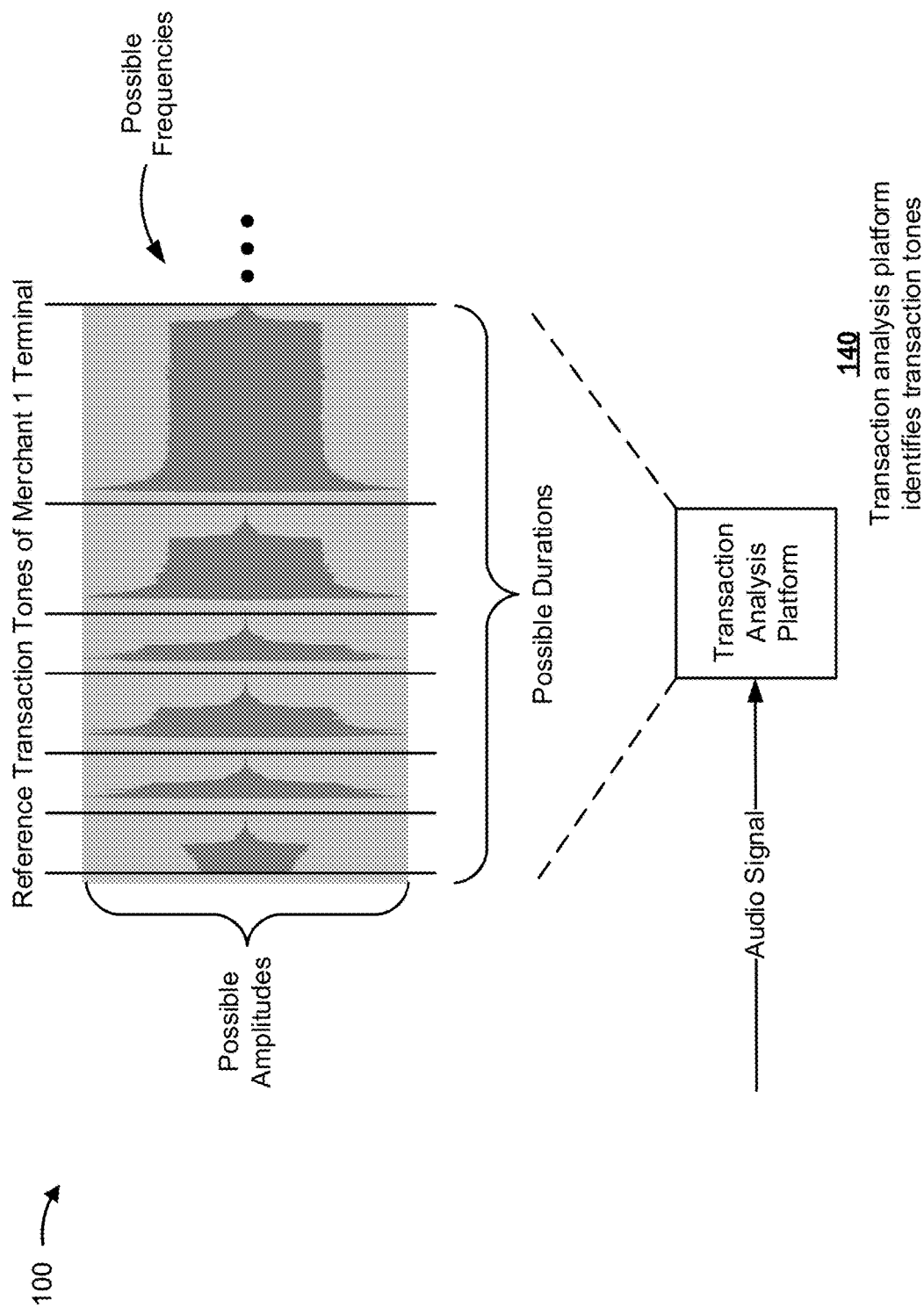

As shown in FIG. 1B, and by reference number 140, the transaction analysis platform identifies transaction tones in the audio signal. As shown, the transaction analysis platform may utilize reference transaction tones associated with the Merchant 1 terminal. In this way, the transaction analysis platform may analyze the audio signal to identify tones and/or sounds that match (e.g., within a threshold) the possible amplitudes, possible frequencies, possible durations, and/or possible wavelengths (not shown) of the reference transaction tones to determine whether items are being registered to the transaction. Each of the different reference transaction tones may correspond to a different stage of the transaction (e.g., starting the transaction, scanning items for the transaction, removing registered items from the transaction, requesting authorization of the transaction, receiving authorization of the transaction, finalizing the transaction, and/or the like), a different stock keeping unit (SKU) number of an item, a different service offered by a vendor, a different vendor that sells items through the merchant, and/or the like.

In some implementations, the transaction analysis platform may detect that the user initiated the transaction based on an analysis of the audio signal. For example, the transaction analysis platform may analyze the audio signal to detect a transaction tone emitted by the transaction device and determine, from the transaction tone, that the transaction was initiated and/or that the transaction is occurring (e.g., relative to a time of the audio signal). As described herein, the transaction tone may be detected based on filtering the audio signal to detect one or more tones from the transaction device that indicates that an item is being registered to the transaction (e.g., to remove other noise that is not associated with the transaction, background noise, and/or the like). For example, the transaction analysis platform may filter out sound and/or noise in the audio signal that does not have one or more audio characteristics associated with the reference transaction tones.

In some implementations, the transaction analysis platform may determine whether a tone (or sound) in the audio signal is a transaction tone or can be associated with a transaction, as described herein. For example, using audio characteristics associated with one or more known transaction tones, the transaction analysis platform may determine whether a tone is or can be a transaction tone. As an example, the transaction analysis platform may determine that past audio characteristics of a tone are associated with a threshold probability of being associated with a transaction tone. In some implementations, the transaction analysis platform may use a scoring system (e.g., with relatively high scores and/or relatively low scores) to identify and/or classify a tone as being associated with a transaction tone. In this case, the transaction analysis platform may determine that a relatively high score (e.g., as being likely a transaction tone) is to be assigned to audio characteristics that are determined to be the same as or similar to previously identified audio characteristics of a transaction tone (and/or are more frequently identified than past identified audio characteristics). In contrast, the transaction analysis platform may determine that a relatively low score (e.g., as being unlikely to be identified) is to be assigned to audio characteristics of tones that are determined to be different than past identified audio characteristics of the transaction tone (and/or less frequently identified than past identified audio characteristics). In a similar manner, the transaction analysis platform may determine, based on the audio characteristic of the transaction tone, a probability that a tone is associated with a transaction; and, when the probability satisfies a threshold, determine that the tone is a transaction tone and/or associated with a transaction.

In some implementations, the transaction analysis platform may use a machine learning model, such as a transaction analysis model, to detect tones of a transaction in an audio signal. For example, the transaction analysis model may be trained based on one or more audio characteristics of one or more tones associated with a particular type of transaction device. For example, such audio characteristics may correspond to frequencies, amplitudes, durations, wavelengths, and/or the like of detectable tones that are associated with the type of transaction device, and/or the like. Furthermore, the transaction analysis model may be trained using historical data associated with detecting transaction tones from one or more other transaction devices according to the audio characteristics. Using the historical data and the one or more audio characteristics as inputs to the task analysis model, the transaction analysis platform may identify tones, in an audio signal, that are associated with a transaction in order to permit the transaction analysis platform to determine a quantity of items involved and/or included in the transaction and/or perform an action associated with the quantity of items.

In this way, the transaction analysis platform may detect a transaction tone and determine that the user is engaged in a transaction based on detecting the transaction tone to permit the transaction analysis platform to determine the quantity of items associated with the transaction.

Figure 1C:
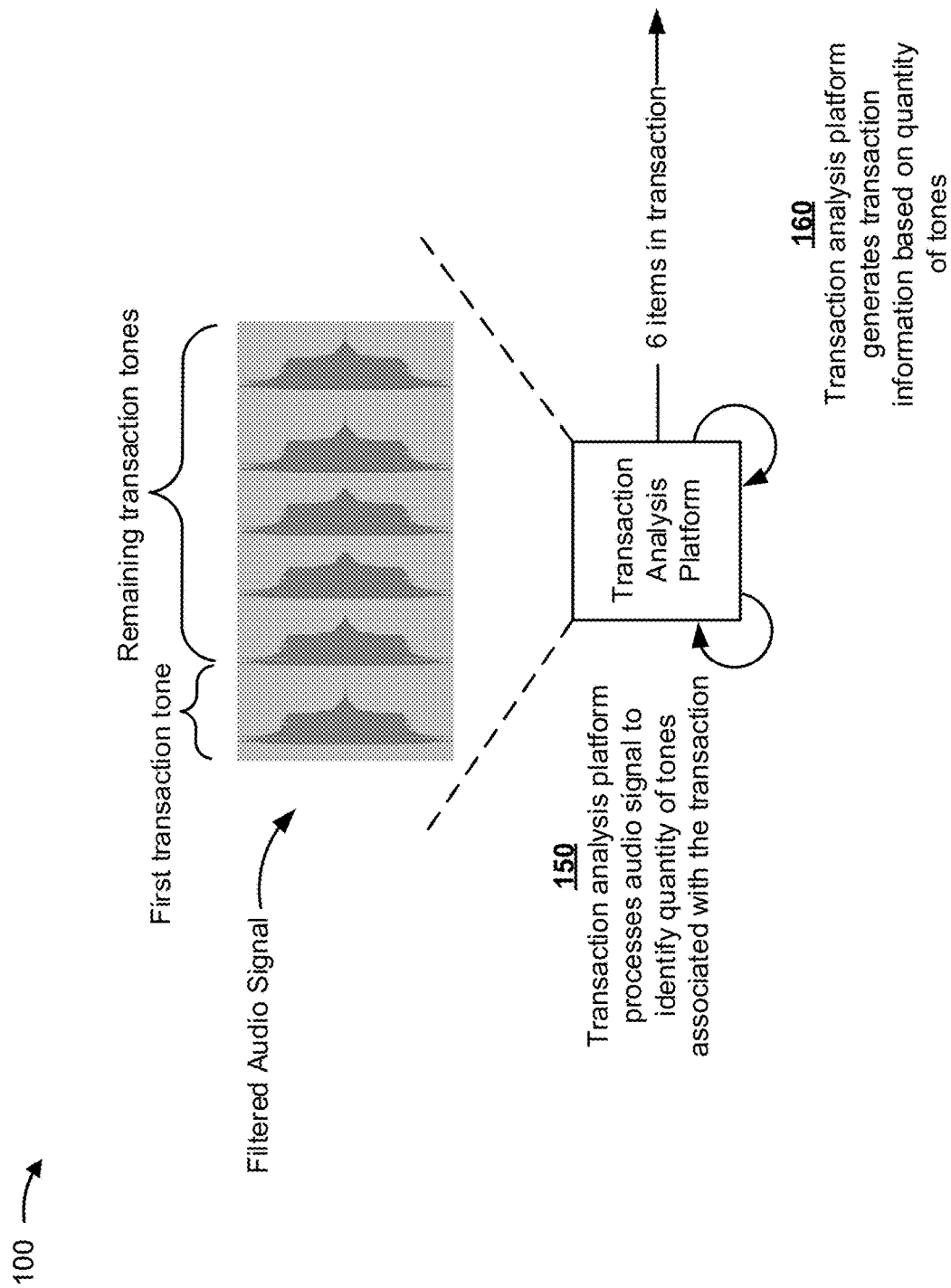

As shown in FIG. 1C, and by reference number 150, the transaction analysis platform processes the audio signal to identify a quantity of tones associated with the transaction. For example, based on detecting that the user is engaged in a transaction, based on detecting a transaction tone (e.g., a first tone associated with an item being registered to the transaction), and/or the like, the transaction analysis platform may process the audio signal to identify a set of tones associated with registering items to the transaction. As described herein, the set of tones associated with registering items to the transaction may be detected based on filtering the audio signal to detect one or more tones associated with the transaction (e.g., one or more tones that have one or more of the same audio characteristics, one or more tones that have a threshold similarity to the transaction tone based on the audio characteristics of the transaction tone, and/or the like).

In some implementations, based on detecting the transaction tone, the transaction analysis platform may analyze remaining audio to identify any other tones in the audio signal that correspond to the transaction tone. For example, the transaction analysis platform may determine one or more audio characteristics of the transaction tone and analyze the audio signal to identify one or more tones that have the same audio characteristics as the transaction tone and/or tones that have a threshold similarity to the transaction tone. In this way, tones in the audio signal that may correspond to a transaction occurring at a different transaction device can be filtered out from the audio signal (e.g., because those tones would have a different audio characteristic, such as a different amplitude or wavelength, due to the difference in distance to the user device). Accordingly, filtering the audio according to the transaction tone (and/or a tone corresponding to a first registered item of a transaction) may prevent false positives when determining a quantity of items associated with a transaction. Furthermore, in such cases, the transaction tone may be one of a set of tones that correspond to an item being registered to a transaction, and any other tones that are determined to be the same as or similar to the transaction tone may correspond to remaining items being registered to the transaction.

As shown in the example of FIG. 1C, the transaction analysis platform processes the audio signal to generate a filtered audio signal of transaction tones. The first transaction tone may correspond to a first item being registered to the transaction, and the remaining five transaction tones may correspond to the remaining five items being registered to the transaction. Accordingly, as described herein, after detecting the first transaction tone in the audio signal, the transaction analysis platform may process the audio signal to identify the remaining transaction tones that have the same or similar characteristics as the first transaction tone.

In this way, the transaction analysis platform may process the audio signal to identify the transaction tones in the audio signal that are associated with registering an item to a transaction to permit the transaction analysis platform to determine a quantity of items in the transaction.

As further shown in FIG. 1C, and by reference number 160, the transaction analysis platform generates transaction information based on the quantity of tones. For example, as shown, the transaction analysis platform may provide (e.g., to a transaction account platform) transaction information that includes the quantity of items of the transaction based on the quantity of tones. Accordingly, the transaction analysis platform may determine that the quantity of items in the transaction corresponds to the quantity of transaction tones detected in the audio signal.

In some implementations, the transaction information may include information associated with the user and/or the user device. For example, the transaction information may include an identity of the user, a location of the user device (e.g., a location corresponding to the location of the merchant), an identifier of an entity associated with the transaction (e.g., an identifier of the merchant, which may be determined based on the location), a time and/or date at which the transaction information is generated, and/or the like. Additionally, or alternatively, the transaction account information may include an identifier (e.g., an account number) of the transaction account of the user. The transaction analysis platform may obtain and/or determine the identifier based on the user registering with an application associated with the transaction analysis platform (e.g., via the user device, when authorizing the transaction analysis platform to manage transactions associated with the transaction account, and/or the like).

In this way, the transaction analysis platform may determine, based on identifying six transaction tones in the audio signal, that six items have been registered to the transaction and/or that the transaction involves six transactions, and generate transaction information associated with the transaction to permit the transaction analysis platform to perform an action associated with the transaction information and/or the transaction account of the user.

Figure 1D:
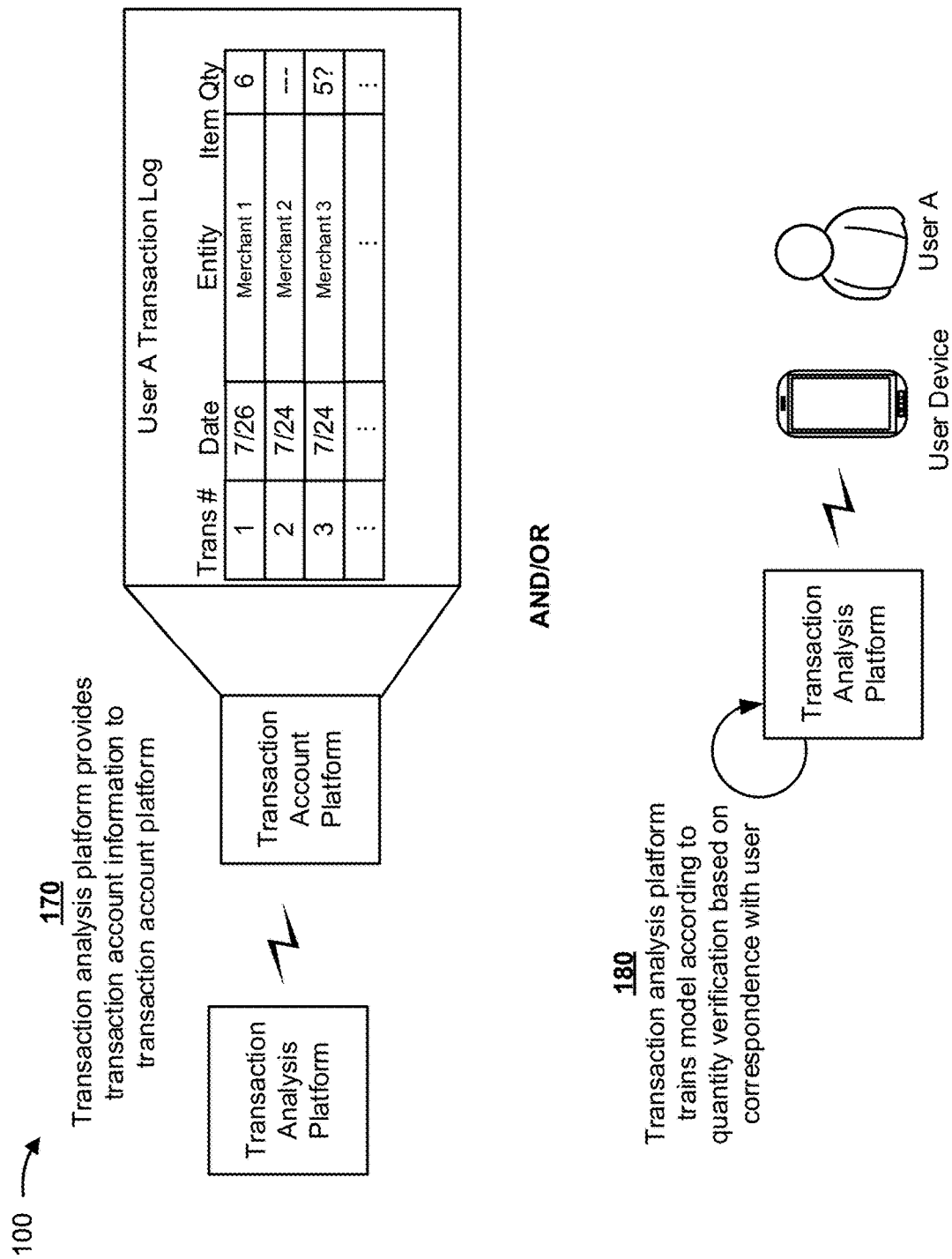

As shown in FIG. 1D, and by reference number 170, the transaction analysis platform provides the transaction information to the transaction account platform. In some implementations, the transaction analysis platform may provide the transaction account information to the transaction account platform to cause the transaction account platform (e.g., a server hosting the transaction account platform) to update a transaction log associated with the transaction account with the quantity of items. For example, the transaction analysis platform may provide the transaction account information and/or instructions to the transaction account platform to cause the transaction account platform to identify the transaction log, identify an entry associated with the transaction (e.g., using an identifier of the merchant that may be included in the transaction information, using time, date, and/or location information in the transaction information), and append the quantity of items to the entry in the transaction log. In this way, the entry may include the quantity of items involved in the transaction. According to some implementations, the transaction account platform may perform any suitable post-processing of the quantity of items (e.g., calculating an average cost of the items of a transaction based on a transaction total and the quantity of items, determining a likelihood of whether the transaction was fraudulent based on the average cost of the items, determining a likely type of product purchased from the merchant based on the average cost of the items, and/or the like).

Accordingly, as shown in User A's transaction log in the example of FIG. 1D, transaction 1 on July 26 with Merchant 1 indicates that the quantity of items involved in the transaction is six. As further shown in the transaction log, a transaction with Merchant 2, which does not utilize a transaction device with a tone output (as shown in FIG. 1A), does not include a quantity of items purchased.

Furthermore, as shown in the transaction log of FIG. 1D, a transaction with Merchant 3, which utilizes an unknown type of transaction device, may include a potential quantity of items (as indicated by the "5?"). In such a case, the transaction analysis platform may have been activated during the transaction with Merchant 3 to analyze audio associated with the transaction, as described herein, but not yet configured to detect transaction tones with a threshold level of accuracy (e.g., because the type of transaction device used by Merchant 3 was unknown to the transaction analysis platform during the transaction). Accordingly, the transaction analysis platform may make an estimation (e.g., using audio characteristics of known transaction tones of known transaction devices) to determine that the transaction with Merchant 3 may have involved five items.

In this way, the transaction analysis platform may provide the transaction information to the transaction account platform to cause the transaction account platform to append a quantity of items to an entry of a transaction log associated with the transaction account of the user. In some implementations, the transaction analysis platform may be configured to append the quantity of items and/or update the transaction log according to the transaction information.

As further shown in FIG. 1D, and by reference number 180, the transaction analysis platform may train the transaction analysis model according to a quantity verification based on a correspondence with the user (e.g., using a supervised learning technique). For example, based on determining a quantity of items registered to the transaction, the transaction analysis platform may request the user to verify the determined quantity. In such cases, following the transaction (e.g., after the transaction analysis platform has determined that the transaction is complete), the transaction analysis platform may prompt the user via a user interface (e.g., a graphical user interface (GUI) of an application associated with the transaction analysis platform) of the user device, may send a message (e.g., an email, a text message, and/or the like), and/or the like that requests the user to verify the quantity of items involved in the transaction. Further, based on feedback from the user (e.g., an answer to the prompt, a response email, a response text message, and/or the like) that indicates whether the determined quantity of items is accurate and/or that indicates an actual quantity of items that were involved in the transaction, the transaction analysis platform may train the transaction analysis model.

As an example, if User A indicates that the determined quantity of items matched an actual quantity of items involved in the transaction, the transaction analysis platform may increase a confidence level and/or a weighting value associated with one or more audio characteristics of one or more of the detected transaction tones for detecting future transaction tones from a transaction device that corresponds to Merchant 1 terminal. On the other hand, if User A indicates that the determined quantity of items did not match an actual quantity of items involved in the transaction, the transaction analysis platform may decrease a confidence level and/or a weighting value associated with one or more audio characteristics of one or more of the detected transaction tones for detecting future transaction tones from a transaction device that corresponds to Merchant 1 terminal.

In some implementations, transaction analysis platform may train the transaction analysis model using an unsupervised learning technique. For example, the transaction analysis platform may receive a receipt (e.g., via a user input, via an analysis, authorized by the user, of a messaging account of the user that includes the receipt, and/or the like) associated with a transaction that was analyzed in accordance with the example implementations described herein. The transaction analysis platform may analyze the receipt (e.g., using any suitable techniques, such as image processing, natural language processing, a document (or receipt) analysis model, and/or the like), identify the actual quantity of items involved in the transaction, and compare the actual quantity to the determined quantity based on the audio of the transaction. The transaction analysis platform may perform such an analysis periodically (e.g., once every ten receipts received, once every 50 receipts received, and/or the like) to verify an accuracy of the transaction analysis model and/or train the transaction analysis model (e.g., to conserve resources).

Referring to the example transaction with Merchant 3, if the user indicates that the quantity of items in the transaction with Merchant 3 is not accurate (e.g., outside of a threshold degree of accuracy relative to an actual quantity of items indicated by the user), the transaction analysis platform may provide such an indication to the transaction account platform to permit the transaction account platform to remove the appended quantity from the transaction log. Additionally, or alternatively, the transaction analysis platform may maintain the mapping of the transaction device information to indicate that the transaction device used by Merchant 3 is unknown. However, if the user indicates that the quantity of items in the transaction with Merchant 3 is accurate, the transaction analysis platform may update the transaction device information for Merchant 3 to reflect that Merchant 3 utilizes a transaction device with a tone output. Additionally, or alternatively, the transaction analysis platform may indicate a particular type of the transaction device based on characteristics of the tones used to detect the five items in the transaction (e.g., using a mapping of types (and/or makes/models) of transaction devices to respective audio characteristics of tones produced by the types of transaction devices). Accordingly, the transaction analysis platform may learn and/or identify whether or not a merchant utilizes a type of transaction device that can be used to analyze transactions, as described herein, and/or train the transaction analysis model to detect transaction tones for future transactions associated with the merchant.

In this way, the transaction analysis platform may train the transaction analysis model (e.g., according to feedback from a user) based on the determined quantity of items, the audio signal, and/or the filtered audio signal.

Accordingly, as described herein, the transaction analysis platform may analyze audio associated with a transaction to determine a quantity of items involved in the transaction. In this way, the transaction analysis platform may conserve resources (e.g., computing resources, network resources, and/or the like) that may be otherwise be spent analyzing receipts of transactions, by analyzing an audio tone and/or providing the quantity in transaction information, which consumes fewer resources than previous techniques to analyze and/or process receipts. Furthermore, the transaction analysis platform may generate and/or provide information that improves a user experience associated with a user managing transactions involving purchases with relatively high valued items and/or relatively low valued items by enabling a user to relatively quickly and efficiently identify average costs of purchased items involved in a transaction without having to sift through receipts of the transaction.

As indicated above, FIGS. 1A-1D are provided as one or more examples. Other examples may differ from what is described with regard to FIGS. 1A-1D.

Figure 2:
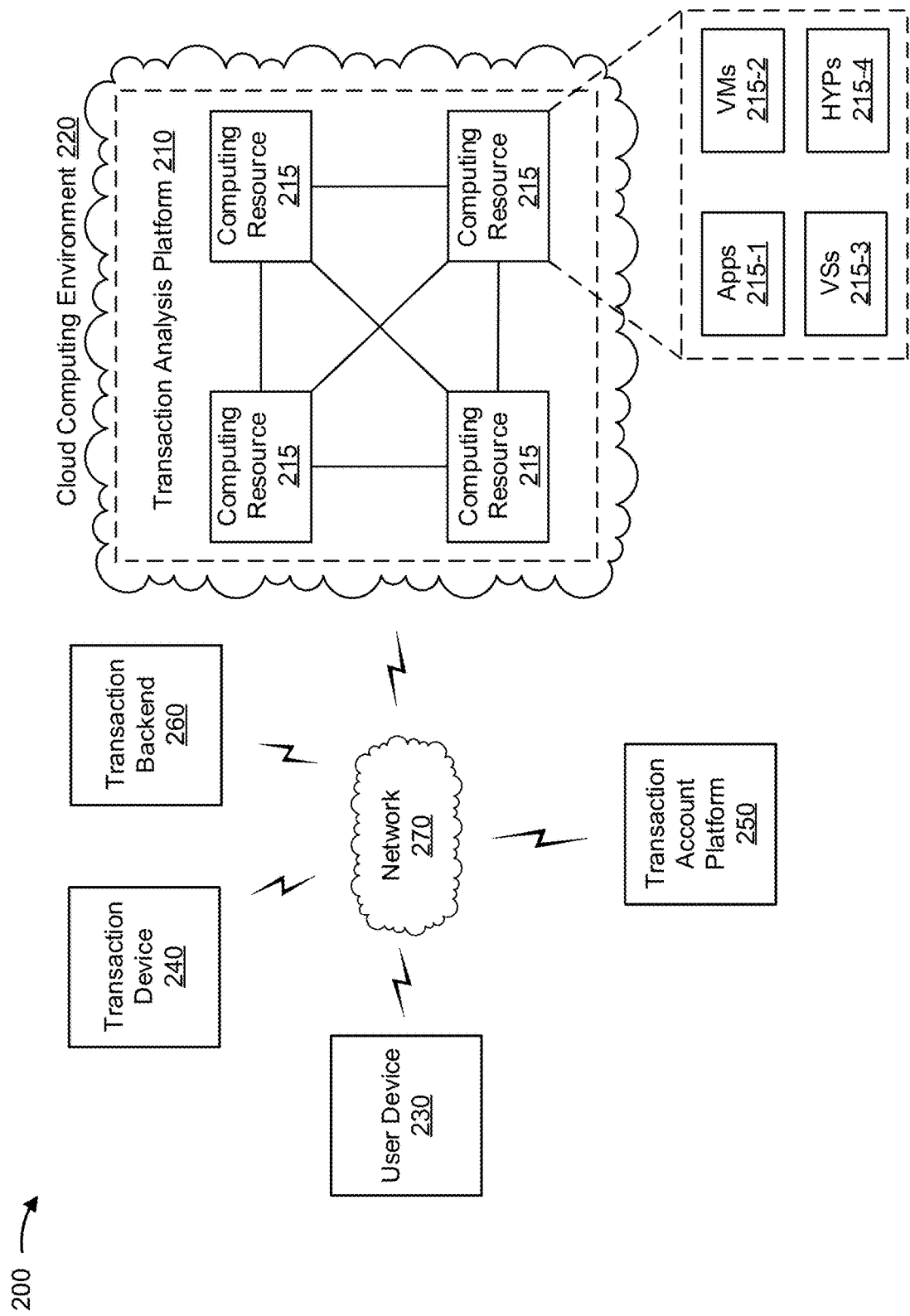
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction analysis platform 210, a computing resource 215, a cloud computing environment 220, a user device 230, a transaction device 240, a transaction account platform 250, a transaction backend 260, and a network 270. Devices of environment 200 may interconnect via wired connections, wireless connections, or a combination of wired and wireless connections.

Transaction analysis platform 210 includes one or more computing resources assigned to perform transaction management based on audio of a transaction, as described herein. For example, transaction analysis platform 210 may be a platform implemented by cloud computing environment 220 that may receive an audio signal, analyze the audio signal to detect a set of tones associated with a transaction, and determine a quantity of items involved in the transaction based on the set of tones. In some implementations, transaction analysis platform 210 is implemented by computing resources 215 of cloud computing environment 220.

Transaction analysis platform 210 may include a server device or a group of server devices. In some implementations, transaction analysis platform 210 may be hosted in cloud computing environment 220. Notably, while implementations described herein may describe transaction analysis platform 210 as being hosted in cloud computing environment 220, in some implementations, transaction analysis platform 210 may be non-cloud-based or may be partially cloud-based. Additionally, or alternatively, transaction analysis platform 210 may be included within and/or associated with a module of user device 230.

Cloud computing environment 220 includes an environment that delivers computing as a service, whereby shared resources, services, and/or the like may be provided to user device 230, transaction device 240, transaction account platform 250, and/or transaction backend 260. Cloud computing environment 220 may provide computation, software, data access, storage, and/or other services that do not require end-user knowledge of a physical location and configuration of a system and/or a device that delivers the services. As shown, cloud computing environment 220 may include transaction analysis platform 210 and computing resource 215.

Computing resource 215 includes one or more personal computers, workstation computers, server devices, or another type of computation and/or communication device. In some implementations, computing resource 215 may host transaction analysis platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on 230. For example, application 215-1 may include software associated with transaction analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

User device 230 includes one or more devices capable of receiving, generating, storing, processing, and/or providing transaction information associated with a transaction via transaction device 240. For example, such transaction information may include an audio signal including a set of tones, a quantity of a set of tones, a quantity of items corresponding to the quantity of the set of tones, location information associated with the user device at a time of the transaction, and/or other transaction information associated with the transaction. User device 230 may include a communication device and/or computing device, such as a mobile phone (e.g., a smartphone, a radiotelephone, and/or the like), a laptop computer, a tablet computer, a handheld computer, a desktop computer, a wearable communication device (e.g., a smart wristwatch, a pair of smart eyeglasses, and/or the like), or a similar type of device. In some implementations, user device 230 may include transaction account information and/or may be used to provide transaction account information to transaction device 240 (e.g., via a mobile payment application). Additionally, or alternatively, user device 230 may include an application and/or module that is associated with and/or that corresponds to transaction analysis platform 210.

Transaction device 240 includes one or more devices capable of receiving, generating, storing, processing, and/or providing transaction account information for a transaction, as described herein. For example, transaction device may include a POS terminal, a security terminal (e.g., to access a secure location, such as a secure building, a secure room, and/or the like), and/or the like.

Transaction device 240 may include and/or be associated with one or more item registration components of a transaction device to identify and/or detect items associated with a transaction. For example, such item registration components may include a character recognition device (e.g., a barcode scanner, a quick response (QR) code scanner, and/or the like), a radio frequency identification (RFID) tag detection device, and/or the like. Additionally, or alternatively, transaction device 240 may include a card reader, a chip reader, an NFC device, a BLUETOOTH™ low-energy (BLE) technology device, and/or the like to enable transaction device 240 to receive transaction account information from a transaction card and/or user device 230.

Furthermore, transaction device 240 may utilize one or more user interfaces (e.g., a speaker, a display, a light emitter, and/or the like) to facilitate registering items of a transaction. For example, transaction device 240 may use a speaker to notify the user and/or a merchant representative that an item has been registered for the transaction. More specifically, transaction device 240 may produce a tone (e.g., a beep) each time an item is registered to the transaction.

Transaction account platform 250 includes one or more devices capable of receiving, generating, storing, processing, and providing information associated with managing a transaction account of a user. For example, transaction account platform may be associated with one or more server devices that include a communication interface that allows transaction account platform 250 to receive information from and/or transmit information to other devices in environment 200. Transaction account platform 250 may include and/or have access to a data structure used to maintain a transaction log of an account of the user, as described herein.

Transaction backend 260 includes one or more devices capable of authorizing and/or facilitating a transaction. For example, transaction backend 260 may include one or more servers and/or computers to store and/or provide information (e.g., authorizations, balances, transaction tokens, security information, account information, and/or the like) associated with processing a transaction via transaction device 240.

Transaction backend 260 may include one or more devices associated with financial institutions (e.g., banks, credit unions, and/or the like) and/or transaction card associations that authorize the transaction and/or facilitate a transfer of funds or payments between an account of a user (e.g., a cardholder) of a transaction card and an account of a merchant of transaction device 240. For example, transaction backend 260 may include one or more devices of one or more issuing financial institutions associated with a user of a transaction account used in the transaction, one or more devices of one or more acquiring financial institutions (or merchant banks) associated with transaction device 240, and/or one or more devices associated with one or more transaction card associations (e.g., VISA®, MASTER-CARD®, and/or the like) associated with a transaction card and/or transaction account used in the transaction. Accordingly, based on receiving transaction account information associated with a user from transaction device 240, various financial institutions and/or card associations of transaction backend 260 may communicate to authorize the transaction and/or transfer funds (corresponding to a payment of the transaction) between transaction accounts associated with the user and/or transaction device 240.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
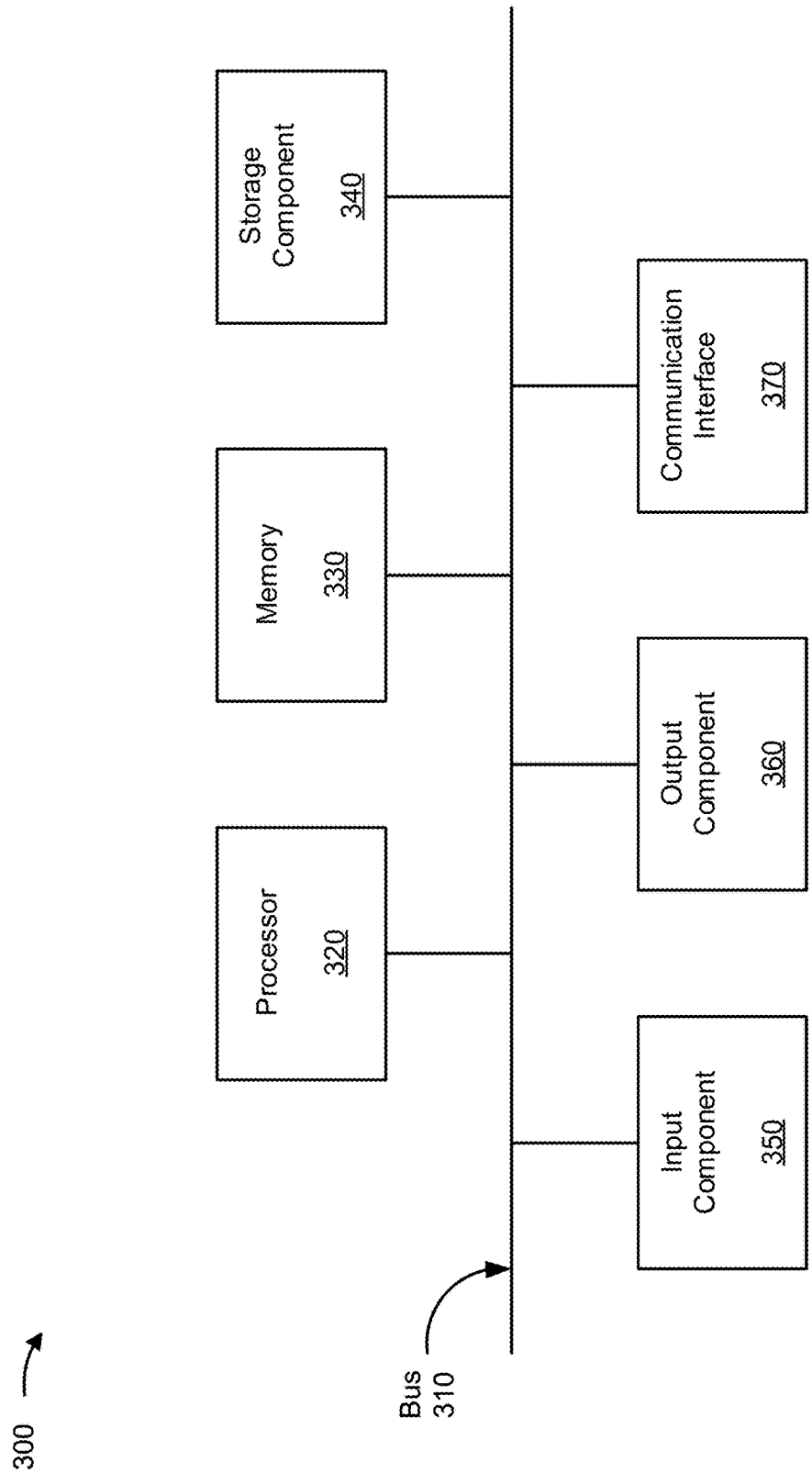
FIG. 3 is a diagram of example components of one or more devices of FIG. 2.

FIG. 3 is a diagram of example components of a device 300. Device 300 may correspond to transaction analysis platform 210, computing resource 215, user device 230, transaction device 240, transaction account platform 250, and/or transaction backend 260. In some implementations, transaction analysis platform 210, computing resource 215, user device 230, transaction device 240, transaction account platform 250, and/or transaction backend 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
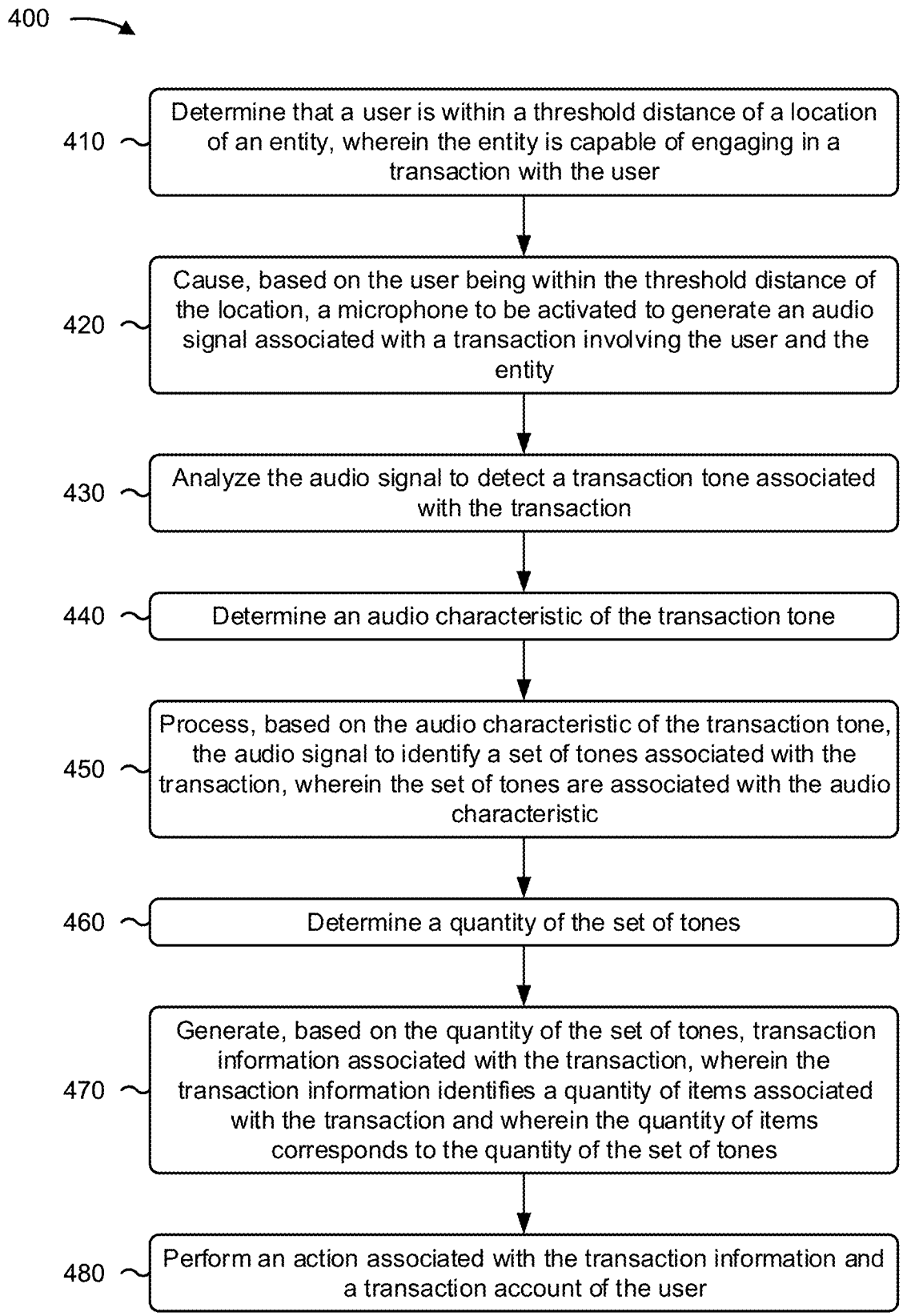
FIGS. 4-6 are flowcharts of one or more example processes associated with transaction management based on audio of a transaction.

FIG. 4 is a flowchart of an example process 400 associated with transaction management based on audio of a transaction. In some implementations, one or more process blocks of FIG. 4 may be performed by a transaction analysis platform (e.g., transaction analysis platform 210). In some implementations, one or more process blocks of FIG. 4 may be performed by another device or a group of devices separate from or including the transaction analysis platform, such as a user device (e.g., user device 230), a transaction device (e.g., transaction device 240), a transaction account platform (e.g., transaction account platform 250), a transaction backend (e.g., transaction backend 260), and/or the like.

As shown in FIG. 4, process 400 may include determining that a user is within a threshold distance of a location of an entity, wherein the entity is capable of engaging in a transaction with the user (block 410). For example, the transaction analysis platform (e.g., using processor 320, memory 330, storage component 340, input component 350, output component 360, communication interface 370 and/or the like) may determine that a user is within a threshold distance of a location of an entity, as described above. In some implementations, the entity (e.g., a merchant) is capable of engaging in a transaction with the user.

As further shown in FIG. 4, process 400 may include causing, based on the user being within the threshold distance of the location, a microphone to be activated to generate an audio signal associated with a transaction involving the user and the entity (block 420). For example, the transaction analysis platform (e.g., using processor 320, memory 330, storage component 340, input component 350, output component 360, communication interface 370 and/or the like) may activate, based on the user being within the threshold distance of the location, a microphone to generate an audio signal associated with a transaction involving the user and the entity, as described above.

As further shown in FIG. 4, process 400 may include analyzing the audio signal to detect a transaction tone associated with the transaction (block 430). For example, the transaction analysis platform (e.g., using processor 320, memory 330, storage component 340, input component 350, output component 360, communication interface 370 and/or the like) may analyze the audio signal to detect a transaction tone associated with the transaction, as described above.

As further shown in FIG. 4, process 400 may include determining an audio characteristic of the transaction tone (block 440). For example, the transaction analysis platform (e.g., using processor 320, memory 330, storage component 340, input component 350, output component 360, communication interface 370 and/or the like) may determine an audio characteristic of the transaction tone, as described above.

As further shown in FIG. 4, process 400 may include processing, based on the audio characteristic of the transaction tone, the audio signal to identify a set of tones associated with the transaction, wherein the set of tones are associated with the audio characteristic (block 450). For example, the transaction analysis platform (e.g., using processor 320, memory 330, storage component 340, input component 350, output component 360, communication interface 370 and/or the like) may process, based on the audio characteristic of the transaction tone, the audio signal to identify a set of tones associated with the transaction, as described above. In some implementations, the set of tones are associated with the audio characteristic.

As further shown in FIG. 4, process 400 may include determining a quantity of the set of tones (block 460). For example, the transaction analysis platform (e.g., using processor 320, memory 330, storage component 340, input component 350, output component 360, communication interface 370 and/or the like) may determine a quantity of the set of tones, as described above.

As further shown in FIG. 4, process 400 may include generating, based on the quantity of the set of tones, transaction information associated with the transaction, wherein the transaction information identifies a quantity of items associated with the transaction and wherein the quantity of items corresponds to the quantity of the set of tones (block 470). For example, the transaction analysis platform (e.g., using processor 320, memory 330, storage component 340, input component 350, output component 360, communication interface 370 and/or the like) may generate, based on the quantity of the set of tones, transaction information associated with the transaction, as described above. In some implementations, the transaction information identifies a quantity of items associated with the transaction. In some implementations, the quantity of items corresponds to the quantity of the set of tones.

As further shown in FIG. 4, process 400 may include performing an action associated with the transaction information and a transaction account of the user (block 480). For example, the transaction analysis platform (e.g., using processor 320, memory 330, storage component 340, input component 350, output component 360, communication interface 370 and/or the like) may perform an action associated with the transaction information and a transaction account of the user, as described above.

Process 400 may include additional implementations, such as any single implementation or any combination of implementations described below and/or in connection with one or more other processes described elsewhere herein.

In a first implementation, the user is determined to be within the threshold distance of the location based on a location system of the device indicating that the device is within the threshold distance of the location. In a second implementation, alone or in combination with the first implementation, the microphone is activated when the user is determined to be within the threshold distance of the location and until the user is determined to not be within the threshold distance of the location.

In a third implementation, alone or in combination with one or more of the first and second implementations, the transaction tone is detected based on monitoring the audio signal for a set of transaction device-specific tones that have one or more reference audio characteristics; the audio characteristic is one of the one or more reference audio characteristics; the set of transaction device-specific tones are associated with a type of transaction device at the location; and the transaction tone is associated with one of the set of transaction device-specific tones.

In a fourth implementation, alone or in combination with one or more of the first through third implementations, processing the audio signal includes filtering the audio signal to disregard other tones in the audio signal that do not have the audio characteristic.

In a fifth implementation, alone or in combination with one or more of the first through fourth implementations, detecting the transaction tone comprises: determining, based on the audio characteristic of the transaction tone, a probability that the transaction tone is associated with the transaction; and determining that the probability satisfies a threshold corresponding to indicating that the transaction tone is associated with a transaction involving the entity; and performing the action comprises prompting the user to verify the transaction information, receiving an indication of whether the transaction information is verified, and causing, based on the indication of whether the transaction information was verified, a transaction analysis model to be trained to use the transaction tone to detect transactions involving the entity.

In a sixth implementation, alone or in combination with one or more of the first through fifth implementations, performing the action comprises: providing the transaction information and instructions to a server to cause the server to: identify a transaction log of the transaction account; analyze, based on an identifier of the entity, the transaction log to identify an entry of the transaction log that corresponds to the transaction; and append the transaction information to the entry to enable the entry to include the quantity of items involved in the transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
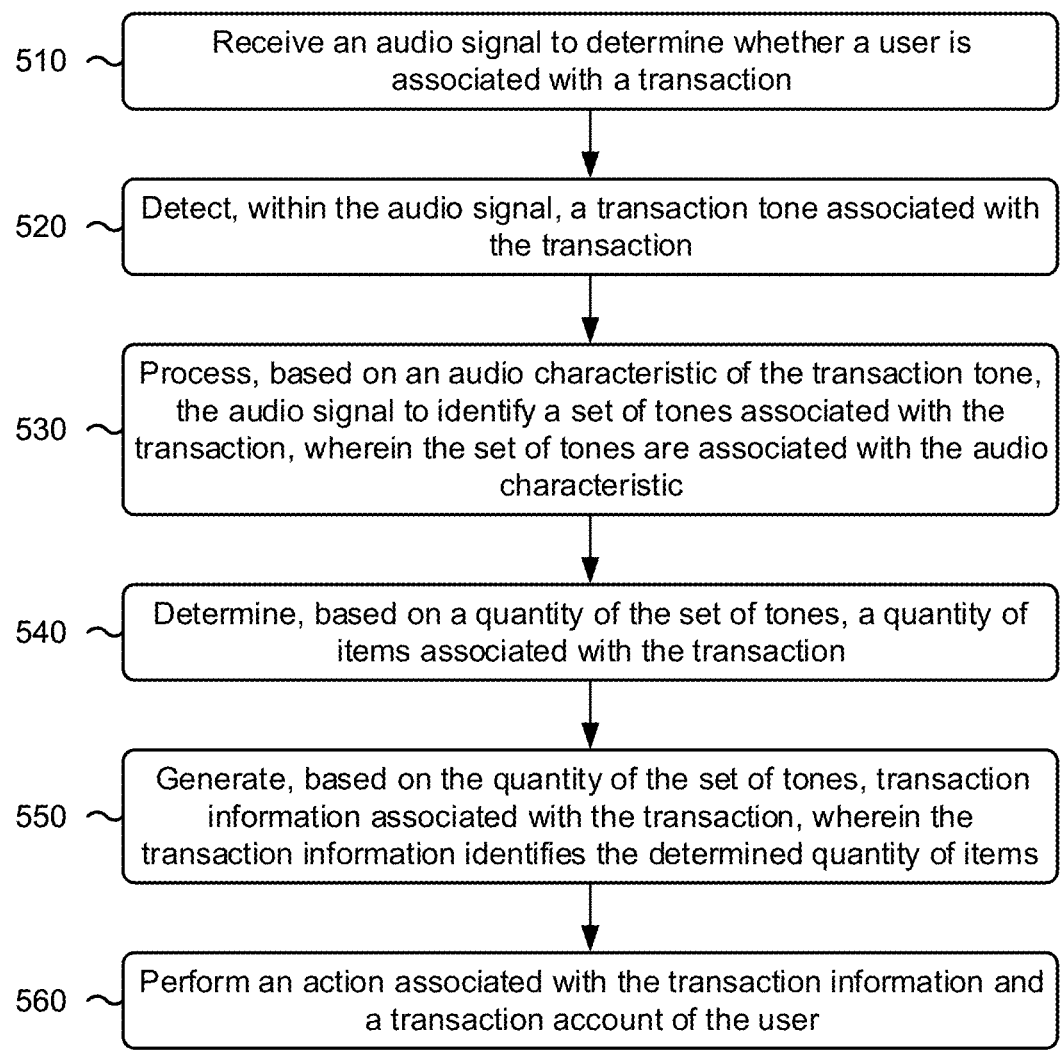

FIG. 5 is a flowchart of an example process 500 associated with transaction management based on audio of a transaction. In some implementations, one or more process blocks of FIG. 5 may be performed by a transaction analysis platform (e.g., transaction analysis platform 210). In some implementations, one or more process blocks of FIG. 5 may be performed by another device or a group of devices separate from or including the transaction analysis platform, such as a user device (e.g., user device 230), a transaction device (e.g., transaction device 240), a transaction account platform (e.g., transaction account platform 250), a transaction backend (e.g., transaction backend 260), and/or the like.

As shown in FIG. 5, process 500 may include receiving an audio signal to determine whether a user is associated with a transaction (block 510). For example, the transaction analysis platform (e.g., using processor 320, memory 330, storage component 340, input component 350, output component 360, communication interface 370 and/or the like) may receive an audio signal to determine whether a user is associated with a transaction, as described above.

As further shown in FIG. 5, process 500 may include detecting, within the audio signal, a transaction tone associated with the transaction (block 520). For example, the transaction analysis platform (e.g., using processor 320, memory 330, storage component 340, input component 350, output component 360, communication interface 370 and/or the like) may detect, within the audio signal, a transaction tone associated with the transaction, as described above.

As further shown in FIG. 5, process 500 may include processing, based on an audio characteristic of the transaction tone, the audio signal to identify a set of tones associated with the transaction, wherein the set of tones are associated with the audio characteristic (block 530). For example, the transaction analysis platform (e.g., using processor 320, memory 330, storage component 340, input component 350, output component 360, communication interface 370 and/or the like) may process, based on an audio characteristic of the transaction tone, the audio signal to identify a set of tones associated with the transaction, as described above. In some implementations, the set of tones are associated with the audio characteristic.

As further shown in FIG. 5, process 500 may include determining, based on a quantity of the set of tones, a quantity of items associated with the transaction (block 540). For example, the transaction analysis platform (e.g., using processor 320, memory 330, storage component 340, input component 350, output component 360, communication interface 370 and/or the like) may determine, based on a quantity of the set of tones, a quantity of items associated with the transaction, as described above.

As further shown in FIG. 5, process 500 may include generating, based on the quantity of the set of tones, transaction information associated with the transaction, wherein the transaction information identifies the determined quantity of items (block 550). For example, the transaction analysis platform (e.g., using processor 320, memory 330, storage component 340, input component 350, output component 360, communication interface 370 and/or the like) may generate, based on the quantity of the set of tones, transaction information associated with the transaction, as described above. In some implementations, the transaction information identifies the determined quantity of items.

As further shown in FIG. 5, process 500 may include performing an action associated with the transaction information and a transaction account of the user (block 560). For example, the transaction analysis platform (e.g., using processor 320, memory 330, storage component 340, input component 350, output component 360, communication interface 370 and/or the like) may perform an action associated with the transaction information and a transaction account of the user, as described above.

Process 500 may include additional implementations, such as any single implementation or any combination of implementations described below and/or in connection with one or more other processes described elsewhere herein.

In a first implementation, the transaction tone is detected based on: identifying an entity associated with a location, wherein the location corresponds to a location of a user device of the user; determining that the audio characteristic is associated a transaction device used by the entity; and analyzing, based on determining that the audio characteristic is associated with the entity, tones of the audio signal that have the audio characteristic. In a second implementation, alone or in combination with the first implementation, the audio characteristic comprises at least one of a frequency, a duration, an amplitude, or a wavelength.

In a third implementation, alone or in combination with one or more of the first and second implementations, the transaction tone is determined to be one of the set of tones, and the transaction tone corresponds to a first item that is registered in the transaction and remaining tones of the set of tones correspond to remaining items that are registered in the transaction. In a fourth implementation, alone or in combination with one or more of the first through third implementations, the quantity of items corresponds to the quantity of the set of tones.

In a fifth implementation, alone or in combination with one or more of the first through fourth implementations, the one or more processors, when performing the action, are configured to: prompt the user to provide an actual quantity of items associated with the transaction; receive feedback that indicates the actual quantity of items; and train a transaction analysis model based on the determined quantity of items, the actual quantity of transaction items, and the audio signal. In a sixth implementation, alone or in combination with one or more of the first through fifth implementations, the one or more processors, when performing the action, are configured to: identify, based on a time or a location of the transaction, an entry of a transaction log that corresponds to the transaction, wherein the transaction log is associated with the transaction account; and append the transaction information to the entry to enable the entry to include the quantity of items involved in the transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
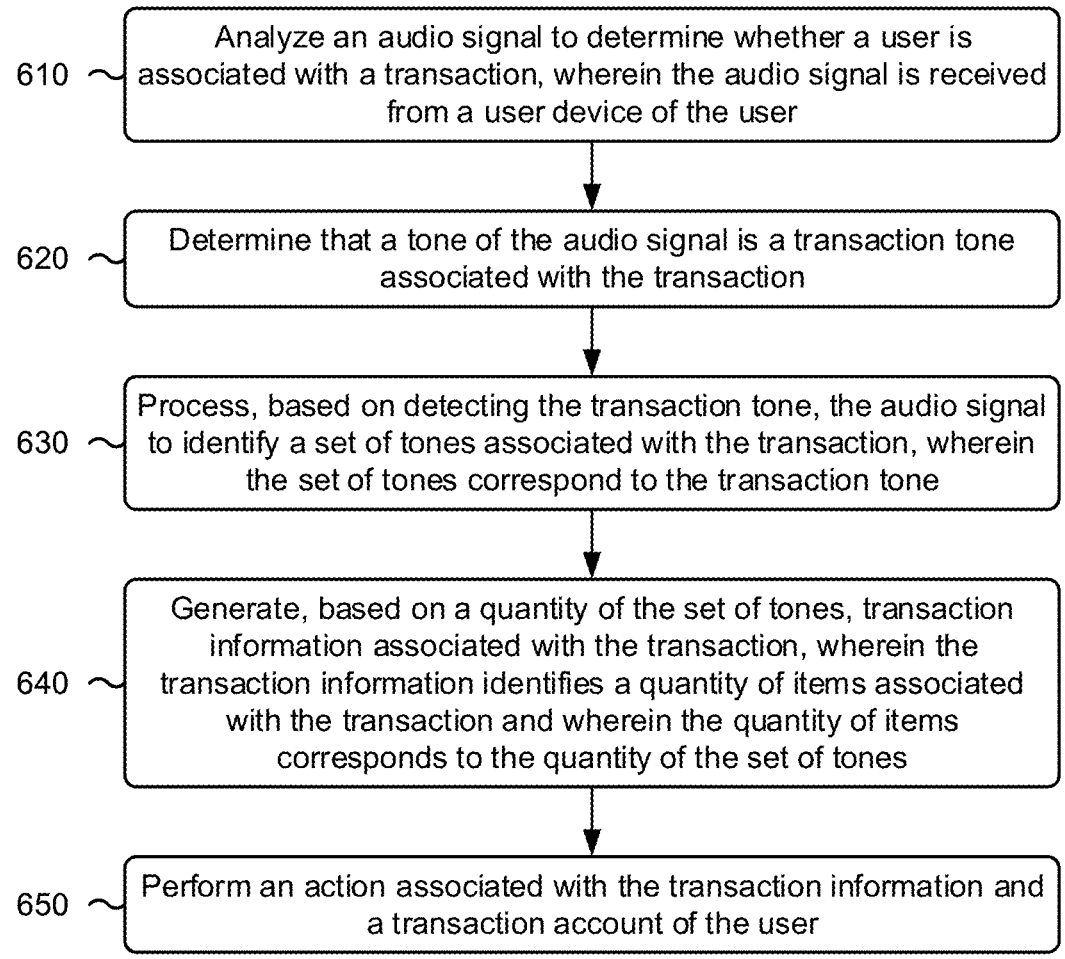

FIG. 6 is a flowchart of an example process 600 associated with transaction management based on audio of a transaction. In some implementations, one or more process blocks of FIG. 6 may be performed by a transaction analysis platform (e.g., transaction analysis platform 210). In some implementations, one or more process blocks of FIG. 6 may be performed by another device or a group of devices separate from or including the transaction analysis platform, such as a user device (e.g., user device 230), a transaction device (e.g., transaction device 240), a transaction account platform (e.g., transaction account platform 250), a transaction backend (e.g., transaction backend 260), and/or the like.

As shown in FIG. 6, process 600 may include analyzing an audio signal to determine whether a user is associated with a transaction, wherein the audio signal is received from a user device of the user (block 610). For example, the transaction analysis platform (e.g., using processor 320, memory 330, storage component 340, input component 350, output component 360, communication interface 370 and/or the like) may analyze an audio signal to determine whether a user is associated with a transaction, as described above. In some implementations, the audio signal is received from a user device of the user.

As further shown in FIG. 6, process 600 may include determining that a tone of the audio signal is a transaction tone associated with the transaction (block 620). For example, the transaction analysis platform (e.g., using processor 320, memory 330, storage component 340, input component 350, output component 360, communication interface 370 and/or the like) may determine that a tone of the audio signal is a transaction tone associated with the transaction, as described above.

As further shown in FIG. 6, process 600 may include processing, based on detecting the transaction tone, the audio signal to identify a set of tones associated with the transaction, wherein the set of tones correspond to the transaction tone (block 630). For example, the transaction analysis platform (e.g., using processor 320, memory 330, storage component 340, input component 350, output component 360, communication interface 370 and/or the like) may process, based on detecting the transaction tone, the audio signal to identify a set of tones associated with the transaction, as described above. In some implementations, the set of tones correspond to the transaction tone.

As further shown in FIG. 6, process 600 may include generating, based on the quantity of the set of tones, transaction information associated with the transaction, wherein the transaction information identifies a quantity of items associated with the transaction and wherein the quantity of items corresponds to the quantity of the set of tones (block 640). For example, the transaction analysis platform (e.g., using processor 320, memory 330, storage component 340, input component 350, output component 360, communication interface 370 and/or the like) may generate, based on the quantity of the set of tones, transaction information associated with the transaction, as described above. In some implementations, the transaction information identifies a quantity of items associated with the transaction. In some implementations, the quantity of items corresponds to the quantity of the set of tones.

As further shown in FIG. 6, process 600 may include performing an action associated with the transaction information and a transaction account of the user (block 650). For example, the transaction analysis platform (e.g., using processor 320, memory 330, storage component 340, input component 350, output component 360, communication interface 370 and/or the like) may perform an action associated with the transaction information and a transaction account of the user, as described above.

Process 600 may include additional implementations, such as any single implementation or any combination of implementations described below and/or in connection with one or more other processes described elsewhere herein.

In a first implementation, the audio signal is analyzed based on: identifying a location of the user device when the audio signal is captured by a microphone of the user device; determining that the location of the user device corresponds to a location of an entity that utilizes a transaction device that outputs tones during transactions; and causing the user device to activate the microphone to capture the audio signal. In a second implementation, alone or in combination with the first implementation, the audio signal is analyzed based on receiving an authorization, from the user, to generate the transaction information for the transaction account.

In a third implementation, alone or in combination with one or more of the first and second implementations, identifying the set of tones that corresponds to the transaction tone is based on at least one of: a threshold number of the set of tones having a frequency that is within a threshold of a frequency of the transaction tone, a threshold number of the set of tones having a duration that is within a threshold of a duration of the transaction tone, or a threshold number of the set of tones having an amplitude that is within threshold of an amplitude of the transaction tone.

In a fourth implementation, alone or in combination with one or more of the first through third implementations, the transaction tone is output from a transaction device associated with performing the transaction. In a fifth implementation, alone or in combination with one or more of the first through fourth implementations, performing the action may include at least one of: sending, to the user device, an indication that includes the quantity of items; training a transaction analysis model associated with detecting the transaction tone or processing the audio signal, wherein the transaction analysis model is trained based on feedback that indicates whether the quantity of items is accurate; or appending the transaction information to an entry of a transaction log of the transaction account.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  determining, by a device, that a user is within a threshold distance of a location of an entity,
    wherein the entity is capable of engaging in a transaction with the user;
  causing, by the device and based on the user being within the threshold distance of the location, a microphone to be activated to generate an audio signal associated with a transaction involving the user and the entity;
  analyzing, by the device, the audio signal to detect a transaction tone associated with the transaction,
    wherein the transaction tone is detected based on monitoring the audio signal for a set of transaction device-specific tones that have one or more reference audio characteristics,
    wherein the set of transaction device-specific tones are associated with a type of transaction device at the location, and
    wherein the transaction tone is associated with one of the transaction device-specific tones of the set of transaction device-specific tones;
  determining, by the device, an audio characteristic of the transaction tone,
    wherein the audio characteristic is one of the one or more reference audio characteristics;
  processing, by the device and based on the audio characteristic of the transaction tone, the audio signal to identify a set of tones associated with the transaction,
    wherein the set of tones are associated with the audio characteristic;
  determining, by the device, a quantity of the set of tones;
  generating, by the device and based on the quantity of the set of tones, transaction information associated with the transaction,
    wherein the transaction information identifies a quantity of items associated with the transaction,
    wherein the quantity of items corresponds to the quantity of the set of tones; and
  performing, by the device, an action associated with the transaction information and a transaction account of the user,
    wherein performing the action comprises:
      providing the transaction information and instructions to a server to cause the server to:
        identify a transaction log of the transaction account;
        analyze, based on an identifier of the entity, the transaction log to identify an entry of the transaction log that corresponds to the transaction; and
        append the transaction information to the entry to enable the entry to include the quantity of items involved in the transaction.

2. The method of claim 1, wherein the user is determined to be within the threshold distance of the location based on a location system of the device indicating that the device is within the threshold distance of the location.

3. The method of claim 1, wherein the microphone is activated when the user is determined to be within the threshold distance of the location until the user is determined to not be within the threshold distance of the location.

4. The method of claim 1, wherein processing the audio signal includes filtering the audio signal to disregard other tones in the audio signal that do not have the audio characteristic.

5. The method of claim 1, wherein detecting the transaction tone comprises:
  determining, based on the audio characteristic of the transaction tone, a probability that the transaction tone is associated with the transaction; and
  determining that the probability satisfies a threshold corresponding to indicating that the transaction tone is associated with a transaction involving the entity;
  wherein performing the action comprises:
    prompting the user to verify the transaction information;
    receiving an indication of whether the transaction information is verified; and
    causing, based on the indication of whether the transaction information was verified, a transaction analysis model to be trained to use the transaction tone to detect transactions involving the entity.

6. A device, comprising:
  one or more memories; and
  one or more processors communicatively coupled to the one or more memories, configured to:
    determine that a user is within a threshold distance of a location of an entity,
      wherein the entity is capable of engaging in a transaction with the user;
    cause, based on the user being within the threshold distance of the location, a microphone to be activated to generate an audio signal associated with a transaction involving the user and the entity;
    detect, within the audio signal, a transaction tone associated with the transaction,
      wherein the transaction tone is detected based on monitoring the audio signal for a set of transaction device-specific tones that have one or more reference audio characteristics,
      wherein the set of transaction device-specific tones are associated with a type of transaction device at the location, and wherein the transaction tone is associated with one of the transaction device-specific tones of the set of transaction device-specific tones;
determine an audio characteristic of the transaction tone,
wherein the audio characteristic is one of the one or more reference audio characteristics;
process, based on the audio characteristic of the transaction tone, the audio signal to identify a set of tones associated with the transaction,
wherein the set of tones are associated with the audio characteristic;
determine, based on a quantity of the set of tones, a quantity of items associated with the transaction;
generate, based on the quantity of the set of tones, transaction information associated with the transaction,
wherein the transaction information identifies the determined quantity of items; and
perform an action associated with the transaction information and a transaction account of the user,
wherein the one or more processors, when performing the action, are configured to:
identify, based on a time or the location of the transaction, an entry of a transaction log that corresponds to the transaction, wherein the transaction log is associated with the transaction account; and
append the transaction information to the entry to enable the entry to include the quantity of items involved in the transaction.

7. The device of claim 6, wherein the audio characteristic comprises at least one of:
a frequency,
a duration,
an amplitude, or
a wavelength.

8. The device of claim 6, wherein the transaction tone is determined to be one of the set of tones, and
wherein the transaction tone corresponds to a first item that is registered in the transaction and remaining tones of the set of tones correspond to remaining items that are registered in the transaction.

9. The device of claim 6, wherein the quantity of items corresponds to the quantity of the set of tones.

10. The device of claim 6, wherein the one or more processors, when performing the action, are configured to:
prompt the user to provide an actual quantity of items associated with the transaction;
receive feedback that indicates the actual quantity of items; and
train a transaction analysis model based on the determined quantity of items, the actual quantity of transaction items, and the audio signal.

11. A non-transitory computer-readable medium storing instructions, the instructions comprising:
one or more instructions that, when executed by one or more processors, cause the one or more processors to:
determine that a user is within a threshold distance of a location of an entity,
wherein the entity is capable of engaging in a transaction with the user;
cause, based on the user being within the threshold distance of the location, a microphone to be activated to generate an audio signal associated with a transaction involving the user and the entity;
detect, within the audio signal, a transaction tone associated with the transaction,
wherein the transaction tone is detected based on monitoring the audio signal for a set of transaction device-specific tones that have one or more reference audio characteristics,
wherein the set of transaction device-specific tones are associated with a type of transaction device at the location, and
wherein the transaction tone is associated with one of the transaction device-specific tones of the set of transaction device-specific tones;
determine an audio characteristic of the transaction tone,
wherein the audio characteristic is one of the one or more reference audio characteristics;
process, based on the audio characteristic of the transaction tone, the audio signal to identify a set of tones associated with the transaction,
wherein the set of tones are associated with the audio characteristic;
generate, based on a quantity of the set of tones, transaction information associated with the transaction,
wherein the transaction information identifies a quantity of items associated with the transaction, wherein the quantity of items corresponds to the quantity of the set of tones; and
perform an action associated with the transaction information and a transaction account of the user,
wherein the one or more instructions, that cause the one or more processors to perform the action, cause the one or more processors to:
identify, based on a time or the location of the transaction, an entry of a transaction log that corresponds to the transaction, wherein the transaction log is associated with the transaction account; and
append the transaction information to the entry to enable the entry to include the quantity of items involved in the transaction.

12. The non-transitory computer-readable medium of claim 11, wherein the audio signal is analyzed based on receiving an authorization, from the user, to generate the transaction information for the transaction account.

13. The non-transitory computer-readable medium of claim 11, wherein identifying the set of tones that corresponds to the transaction tone is based on at least one of:
a threshold number of the set of tones having a frequency that is within a threshold of a frequency of the transaction tone,
a threshold number of the set of tones having a duration that is within a threshold of a duration of the transaction tone, or
a threshold number of the set of tones having an amplitude that is within threshold of an amplitude of the transaction tone.

14. The non-transitory computer-readable medium of claim 11, wherein the transaction tone is output from a transaction device associated with performing the transaction.

15. The non-transitory computer-readable medium of claim 11, wherein the one or more instructions, that cause the one or more processors to perform the action, cause the one or more processors to at least one of:
receive an indication that includes the quantity of items; or train a transaction analysis model associated with detecting the transaction tone or processing the audio signal, wherein the transaction analysis model is trained based on feedback that indicates whether the quantity of items is accurate.

16. The method of claim 1, wherein the audio characteristic comprises at least one of:
 a frequency,
 a duration,
 an amplitude, or
 a wavelength.

17. The method of claim 1, wherein the transaction tone is determined to be one of the set of tones, and
 wherein the transaction tone corresponds to a first item that is registered in the transaction and remaining tones of the set of tones correspond to remaining items that are registered in the transaction.

18. The device of claim 6, wherein the user is determined to be within the threshold distance of the location based on a location system of the device indicating that the device is within the threshold distance of the location.

19. The device of claim 6, wherein the microphone is activated when the user is determined to be within the threshold distance of the location until the user is determined to not be within the threshold distance of the location.

20. The non-transitory computer-readable medium of claim 11, wherein the audio characteristic comprises at least one of:
 a frequency,
 a duration,
 an amplitude, or
 a wavelength.

21. The non-transitory computer-readable medium of claim 11, wherein the transaction tone is determined to be one of the set of tones, and
 wherein the transaction tone corresponds to a first item that is registered in the transaction and remaining tones of the set of tones correspond to remaining items that are registered in the transaction.

* * * * *